(12) United States Patent
Routier

(10) Patent No.: US 7,863,341 B2
(45) Date of Patent: Jan. 4, 2011

(54) PREPARATION OF SYNGAS

(75) Inventor: Arold Marcel Albert Routier, The Hague (NL)

(73) Assignee: Shell Oil Company, Houston, TX (US)

( * ) Notice: Subject to any disclaimer, the term of this patent is extended or adjusted under 35 U.S.C. 154(b) by 456 days.

(21) Appl. No.: 11/988,955

(22) PCT Filed: Jul. 18, 2006

(86) PCT No.: PCT/EP2006/064358

§ 371 (c)(1),
(2), (4) Date: Jan. 17, 2008

(87) PCT Pub. No.: WO2007/009984

PCT Pub. Date: Jan. 25, 2007

(65) Prior Publication Data

US 2010/0113624 A1    May 6, 2010

(30) Foreign Application Priority Data

Jul. 20, 2005   (EP)  .................................. 05254535

(51) Int. Cl.
   *C01B 3/24*    (2006.01)
   *C07C 27/06*   (2006.01)
   *C07C 5/13*    (2006.01)
   *C07C 5/02*    (2006.01)
   *B01J 38/10*   (2006.01)
   *C10G 73/06*   (2006.01)
   *C10G 47/00*   (2006.01)
   *E21C 41/16*   (2006.01)
   *E21C 41/18*   (2006.01)

(52) U.S. Cl. ................... 518/702; 208/33; 208/107; 208/209; 208/264; 252/373; 299/16; 502/53; 518/703; 518/704

(58) Field of Classification Search ................ 252/373; 585/250, 734; 518/702, 703, 704; 208/33, 208/107, 209, 264; 299/16; 502/53
See application file for complete search history.

(56) References Cited

U.S. PATENT DOCUMENTS

| 6,448,441 | B1 | 9/2002 | Wing-Chiu et al. ........... 564/67 |
| 2003/0236312 | A1 | 12/2003 | O'Rear ....................... 518/728 |
| 2004/0181313 | A1 | 9/2004 | Mohedas et al. ............ 700/268 |

FOREIGN PATENT DOCUMENTS

| DE | 3242206 | 5/1984 |
| WO | WO9955618 | 11/1999 |

OTHER PUBLICATIONS

International Search Report dated Sep. 22, 2006 (PCT/EP2006/064358).
Kirk-Othmer, Encyclopedia of Chemical Technology, 4$^{th}$ Edition, vol. 6, p. 584.

*Primary Examiner*—Wayne Langel

(57) ABSTRACT

The present invention discloses a process for the preparation of syngas from two sources with different hydrogen:carbon ratios, the first source having a low hydrogen:carbon ratio including any one or a combination of coal, brown coal, peat, bitumen and tar sands, and the second source having a high hydrogen:carbon ratio including any one or a combination of natural gas, associated gas and coal bed methane. The sources are converted to syngas and then combined to provide syngas with an optimum hydrogen:carbon monoxide ratio for use in a Fischer-Tropsch process.

12 Claims, 1 Drawing Sheet

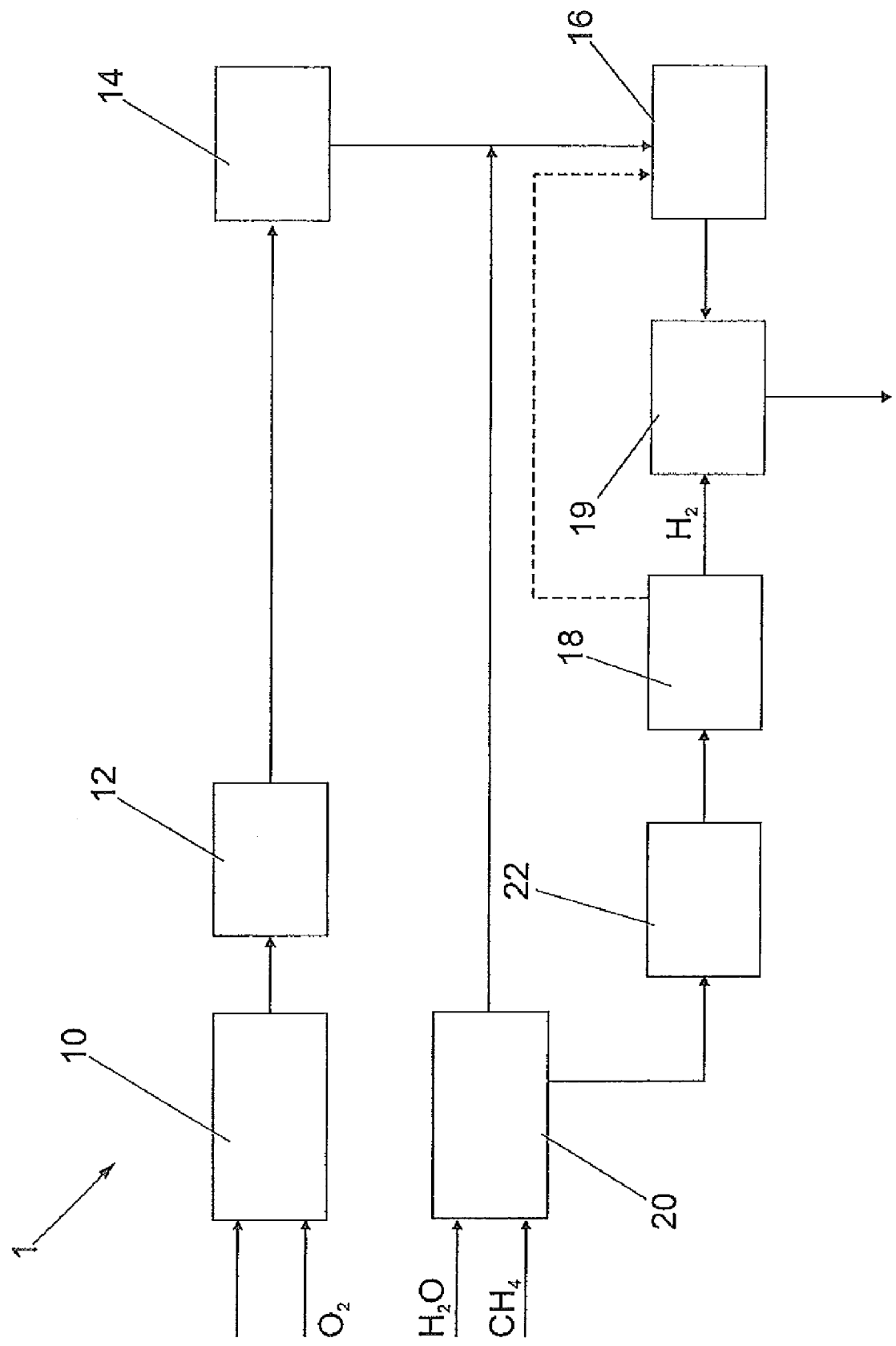

PREPARATION OF SYNGAS

PRIORITY CLAIM

The present application claims priority to European Patent Application 05254535.7 filed Jul. 20, 2005.

FIELD OF THE INVENTION

The present invention relates to a process for the preparation of syngas, particularly for use in a hydrocarbon synthesis process, for example the Fischer-Tropsch process or methanol synthesis process, especially the Fischer-Tropsch process.

BACKGROUND OF THE INVENTION

The Fischer-Tropsch process can be used for the conversion of hydrocarbonaceous feedstocks into liquid and/or solid hydrocarbons. The feedstock (e.g. natural gas, associated gas, coal-bed methane, heavy oil residues, peat, biomass, coal) is converted in a first step into a mixture of hydrogen and carbon monoxide (this mixture is often referred to as synthetic gas or syngas). The synthesis gas is then fed into a reactor where it is converted over a suitable catalyst at elevated temperature and pressure into paraffinic compounds ranging from methane to high molecular weight molecules comprising up to 200 carbon atoms, or, under particular circumstances, even more.

For a general overview for the Fischer-Tropsch process reference is made to Fischer-Tropsch Technology, Studies in Surface Science and Catalysis, Vol. 152, Steynberg and Dry (ed.) Elsevier, 2004, Amsterdam, 0-444-51354-X. Reference is further made to review articles in Kirk Othmer, Encyclopedia of Chem. Techn. and Ullmann's Encyclopedia of Ind. Chem., Vol. 6, $4^{th}$ edition, p. 584 ff.

As mentioned above, "coal" and heavy oil residues are examples of feedstocks for the Fischer-Tropsch process. However, there are many other solid or very heavy (viscous) fossil fuels which may be used as feedstock for the process, including solid fuels such as anthracite, brown coal, bituminous coal, sub-bituminous coal, lignite, petroleum coke, peat and the like, and heavy residues (tar sand, residue from refineries such as residual oil fractions boiling above 360° C., especially above 550° C., more especially above 750° C.) directly derived from crude oil, or from oil conversion processes such as thermal cracking, catalyte cracking, hydrocracking. All such types of fuels have different levels of 'quality', that is the proportions of carbon and hydrogen, as well as substances regarded as 'impurities', generally sulfur and sulfur-based compounds.

Gasification of solid carbonaceous fuels such as coal is well known, and generally involves milling or otherwise grinding the fuel to a preferred size or size range, followed by heating the fuel with oxygen in a gasifier. This creates the mixture of hydrogen and carbon monoxide referred to as syngas. However, the proportion of carbon and hydrogen in solid carbonaceous fuels is generally such that the hydrogen/carbon monoxide ($H_2/CO$) ratio in the syngas formed is generally less than 1, whereas Fischer-Tropsch processes based on cobalt-catalysts generally desire a $H_2/CO$ ratio in the syngas to the synthesis reactor from 1.9 to approximately 2.2, frequently 2.0-2.1. Higher ratio syngases are also desired for other parts or sections of a Fischer-Tropsch plant: some parts may desire a substantially pure hydrogen stream, that is, a very high $H_2/CO$ ratio.

SUMMARY OF THE INVENTION

According to one aspect of the present invention there is provided a process for the preparation of syngas from two hydrocarbonaceous sources with different hydrogen:carbon ratios—
the first source having a low hydrogen:carbon ratio including any one or a combination of coal, brown coal, peat, coke, pitch, bitumen and heavy hydrocarbons derived from tar sands, especially bitumen;
the second source having a high hydrogen:carbon ratio including any one or a combination of natural gas, associated gas and coal bed methane preferably coal bed methane;
in which process the first source is converted into a first syngas stream with a low hydrogen:carbon monoxide ratio, and the second source is converted into a second syngas stream with a high hydrogen:carbon monoxide ratio; the first and a part of the second syngas streams are combined into a combined syngas stream, the combined stream having an $H_2/CO$-ratio of between 1.1 and 1.9, preferably between 1.3 and 1.7, while using the other part of the second syngas stream for hydrogen supply.

BRIEF DESCRIPTION OF THE DRAWINGS

FIG. 1 is a diagrammatic view of a Fischer-Tropsch plant. The drawing is a diagrammatic view of a Fischer-Tropsch plant.

DETAILED DESCRIPTION OF THE INVENTION

Preferably the process includes using at least a portion of each of the first and second syngas streams as a feed to at least one Fischer-Tropsch reactor.

Preferably the first and second syngas streams are combined into a combined stream, and the combined stream is used as a feed for the at least one Fischer-Tropsch reactor, while using the other part of the second syngas stream for hydrogen supply to the Fischer-Tropsch process or for upgrading the products of that process.

Typically the hydrocarbons formed by the process are normally gaseous, normally liquid or optionally normally solid hydrocarbons. The term normally relates to STP conditions (i.e. 0° C., 1 bar).

The second source may be coal bed methane. The second source comprises mainly, i.e. suitably more than 90 v/v %, especially more than 94%, $C_{1-4}$ hydrocarbons, and especially comprises at least 60 v/v percent methane, preferably at least 75%, more preferably 90%. Very suitably natural gas or associates gas is used. Suitably, any sulphur in the second source is removed.

Preferably the first source is converted to the first syngas stream by partial oxidation, optionally in combination with catalytic reforming. Optionally steam/$CO_2$ reforming may also be used in combination with partial oxidation.

Preferably the second source may be converted into the second syngas stream by autothermal reforming and/or reforming, typically steam/$CO_2$ reforming, preferably steam methane reforming.

Optionally the second source may be converted into the second syngas stream by partial oxidation. A further option is to convert the second source by partial oxidation in combination with reforming.

The low hydrogen:carbon monoxide ratio may be between 0.3 and 1.1, especially between 0.5 and 0.8, more in particular 0.3-0.9 in the case that coke coal, brown coal, pitch or bitumen are used, more in particular 0.5-1.1 when peat, biomass and heavy hydrocarbons are used.

The high hydrogen:carbon monoxide ratio may be between 3:1 and 8:1, especially between 5:1 and 6:1.

Preferably the first source has a hydrogen:carbon ratio of 0.6:1-2:1, especially 0.8:1-1.4:1.

Preferably the second source has a hydrogen:carbon ratio of 2.4:1-4:1, especially 3:1-4:1.

The second stream of syngas having a high hydrogen:carbon monoxide ratio may also be used for a second stage Fischer-Tropsch reaction, that is a Fischer-Tropsch reactor receiving unconverted syngas with a low hydrogen:carbon monoxide ratio from another, upstream, Fischer-Tropsch reactor.

A part of the second stream of syngas having a high hydrogen:carbon monoxide ratio may be treated to remove the carbon monoxide, typically by converting it to carbon dioxide in a shift reactor, and the carbon dioxide then removed to leave a hydrogen stream. The carbon dioxide may be removed using a pressure swing adsorption system. Preferably part of the second stream (for example up to 40%) is used for the preparation of high purity hydrogen.

This arrangement reduces or even eliminates the need for a separate source of hydrogen, e.g. from an external supply, which is otherwise commonly used where available.

The hydrogen may then be used for various purposes including Fischer-Tropsch reactions, hydrotreating especially hydrogenation, hydroisomerisation and/or hydrocracking; catalytic dewaxing, and for hydrodesulfurisation of condensate. The hydrogen may also be used for catalyst activation and regeneration. The method of the present invention can provide a combined syngas stream with a $H_2/CO$ ratio more suitable for efficient hydrocarbon synthesis carried out on a given catalyst, such as in one or more Fischer-Tropsch reactors, as well as being able to accommodate variation in the $H_2/CO$ ratio of syngas formed from different qualities of feedstock fuels.

The hydrogen:carbon monoxide ratio in syngas formed by gasification of most types of sources having a low hydrogen:carbon ratio is generally about or less than 1, and is commonly about 0.3-0.6 for coal-derived syngas, and 0.5-0.9 for heavy residue-derived syngas. It is possible to use such a hydrogen:carbon monoxide ratio in a Fischer-Tropsch process, but more satisfactory results can be achieved by increasing the hydrogen:carbon monoxide ratio.

The present invention allows for the use of a more preferred hydrogen:carbon monoxide ratio in the syngas to a ratio which is known to provide more satisfactory results during the synthesis step, especially higher quality and higher selectivity of the hydroconversion synthesis. Preferably the hydrogen:carbon monoxide ratio of the combined syngas streams to the Fischer-Tropsch process is greater than 1.5, preferably in the range 1.6-2.3, and more preferably in the range 1.7-2.2, especially approximately 2.1.

The first and second streams of syngas may be combined in any manner and any ratio in order to produce a combined stream of syngas with the required ratio of hydrogen:carbon monoxide.

The gasification of coal is well known in the art. Generally, the coal is milled to a desired particle size or particle size range, before being transported to a gasifier. The gasifier requires the input of an oxygen stream. One source of oxygen could be an air separation unit, which divides air into its nitrogen and oxygen components.

The present invention also provides syngas whenever prepared by a process as herein described.

The hydrocarbon synthesised by a Fischer-Tropsch process may have undergone the steps of hydroprocessing, preferably hydrogenation, hydroisomerisation and/or hydrocracking.

The hydrocarbon synthesised by a Fischer-Tropsch process may be a fuel, preferably naphtha, kero or gasoil, a waxy raffinate or a base oil.

Preferably the syngas from at least the first source passes through a carbon dioxide/hydrogen sulfide ($CO_2/H_2S$) removal system. The removal system may involve one or more removal units.

The present invention may also involve one or more further removal systems, guards or scrubbing units, either as back-up or support to the $CO_2/H_2S$ removal system, or to assist in the reduction and/or removal of other contaminants such as HCN, $NH_3$, COS and $H_2S$, metals, carbonyls, hydrides or other trace contaminants.

The reforming reaction is well known in the art. Generally, water, usually in the form of steam, is mixed with the methane to form carbon dioxide and hydrogen. The catalyst used can be any of the known catalysts for such a reaction, including iron, chromium, copper and zinc.

Copper on zinc oxide is a known reforming catalyst.

The Fischer-Tropsch synthesis is well known to those skilled in the art and involves synthesis of hydrocarbons from a gaseous mixture of hydrogen and carbon monoxide, by contacting that mixture at reaction conditions with a Fischer-Tropsch catalyst.

Products of the Fischer-Tropsch synthesis may range from methane to heavy paraffinic waxes. Preferably, the production of methane is minimised and a substantial portion of the hydrocarbons produced have a carbon chain length of a least 5 carbon atoms. Preferably, the amount of $C_5+$ hydrocarbons is at least 60% by weight of the total product, more preferably, at least 70% by weight, even more preferably, at least 80% by weight, most preferably at least 85% by weight. Reaction products which are liquid phase under reaction conditions may be physically separated. Gas phase products such as light hydrocarbons and water may be removed using suitable means known to the person skilled in the art.

Fischer-Tropsch catalysts are known in the art, and typically include a Group VIII metal component, preferably cobalt, iron and/or ruthenium, more preferably cobalt. Preferred embodiments of the present invention comprise a is a non-shifting catalyst in the Fischer-Tropsch reactor, preferably a cobalt based catalyst.

Typically, the catalysts comprise a catalyst carrier. The catalyst carrier is preferably porous, such as a porous inorganic refractory oxide, more preferably alumina, silica, titania, zirconia or mixtures thereof.

The optimum amount of catalytically active metal present on the carrier depends inter alia on the specific catalytically active metal. Typically, the amount of cobalt present in the catalyst may range from 1 to 100 parts by weight per 100 parts by weight of carrier material, preferably from 10 to 50 parts by weight per 100 parts by weight of carrier material.

The catalytically active metal may be present in the catalyst together with one or more metal promoters or co-catalysts. The promoters may be present as metals or as the metal oxide, depending upon the particular promoter concerned. Suitable promoters include oxides of metals from Groups IIA, IIIB, IVB, VB, VIB and/or VIIB of the Periodic Table, oxides of the lanthanides and/or the actinides. Preferably, the catalyst comprises at least one of an element in Group IVB, VB and/or VIIB of the Periodic Table, in particular titanium, zirconium, manganese and/or vanadium. As an alternative or in addition to the metal oxide promoter, the catalyst may comprise a metal promoter selected from Groups VIIB and/or VIII of the Periodic Table. Preferred metal promoters include rhenium, platinum and palladium.

Reference to the Periodic Table as used herein relate to the previous IUPAC form of the Periodic Table such as that described in the 68th edition of the Handbook of Chemistry and Physics (CPC Press).

A most suitable catalyst comprises cobalt as the catalytically active metal and zirconium as a promoter. Another most suitable catalyst comprises cobalt as the catalytically active metal and manganese and/or vanadium as a promoter.

The promoter, if present in the catalyst, is typically present in an amount of from 0.1 to 60 parts by weight per 100 parts by weight of carrier material. It will however be appreciated that the optimum amount of promoter may vary for the respective elements which act as promoter.

The Fischer-Tropsch synthesis is preferably carried out at a temperature in the range from 125 to 350° C., more preferably 175 to 275° C., most preferably 200 to 260° C. The pressure preferably ranges from 5 to 150 bar abs., more preferably from 5 to 80 bar abs.

The Fischer-Tropsch synthesis may be carried out in a slurry phase regime or an ebullating bed regime, wherein the catalyst particles are kept in suspension by an upward superficial gas and/or liquid velocity.

Another regime for carrying out the Fischer-Tropsch reaction is a fixed bed regime, especially a trickle flow regime. A very suitable reactor is a multitubular fixed bed reactor.

It will be understood that the skilled person is capable to select the most appropriate conditions for a specific reactor configuration and reaction regime.

In a preferred embodiment, the present invention concerns a multi-stage process for the production of hydrocarbon products from syngas, each stage of the process comprising 1) providing one or more syngas conversion reactors in which syngas is partially converted into hydrocarbon products at conversion conditions, 2) each conversion reactor having a syngas entry stream system which system combines two or more entry streams of syngas and which system delivers the combined syngas to the syngas conversion reactor, the syngas entry system combining A) at least one entry stream of syngas being a syngas stream prepared from two hydrocarbonaceous sources with different hydrogen:carbon ratios— the first source having a low hydrogen:carbon ratio including any one or a combination of coal, brown coal, peat, coke, pitch, bitumen and heavy hydrocarbons derived from tar sands, especially bitumen;

the second source having a high hydrogen:carbon ratio including any one or a combination of natural gas, associated gas and coal bed methane, preferably coal bed methane;

in which process the first source is converted into a first syngas stream with a low hydrogen:carbon monoxide ratio, and the second source is converted into a second syngas stream with a high hydrogen:carbon monoxide ratio; the first and a part of the second syngas streams are combined into a combined syngas stream, the combined stream having an $H_2/CO$-ratio of between 1.1 and 1.9, preferably between 1.3 and 1.7 (for the first stage) or B) an exit stream of syngas from the previous stage, the $H_2/CO$ ratio of the exit stream of syngas being between 0.2 and 0.9, preferably between 0.3 and 0.7, together with another part of the second syngas stream, (for all stages except the first stage), with another syngas stream being a recycle stream from the conversion reactor having an H2/CO ratio between 0.2 and 0.9, preferably between 0.3 and 0.7, the combined syngas having an $H_2/CO$ ratio between 1.0 and 1.6, preferably between 1.1 and 1.5, and 3) a syngas exit stream system which discharges an exit stream of syngas from the reactor, the $H_2/CO$ ratio of the exit stream of syngas being between 0.2 and 0.9, preferably between 0.3 and 0.7, the exit stream partly being used as the recycle stream to the syngas entry system as mentioned above, and, in the case that there is a further stage in the process, as feed for the next stage. For the above process all preferred embodiments apply as hereinbefore described for the process of claim 1.

A multi-stage conversion process wherein an entry stream for the second, third, fourth stages, etc. is enriched with hydrogen provides the ability to adjust the CO conversion level at each stage and to increase the overall CO conversion as well as to increase the $C_5+$-selectivity of the process. This therefore gives greater flexibility for the user to select operational parameters, including the yield and quality of hydrocarbon products formed by the process. It is observed that the combined syngas stream for each stage is in the range of 1.0 to 1.6. This results in the highest $C_5+$-selectivity and an optimum CO conversion.

An embodiment of the present invention will now be described, by way of example only, with reference to the accompanying drawing.

The drawing shows a Fischer-Tropsch plant 1 comprising, in series, a coal gasification unit 10, a solids removal unit 12, an acid gas removal unit ("AGR") 14, a Fischer-Tropsch reactor 16 and a product work up unit 19.

Separate from the coal gasification unit 10 is a steam methane reformer (SMR) unit 20, which supplies syngas to the Fischer-Tropsch reactor 16 downstream of the AGR 14.

Coal or other feedstock with a low hydrogen:carbon ratio is gassified in the presence of oxygen in the coal gasification unit 10 producing a mixture of, predominantly, hydrogen and carbon monoxide. The ratio of hydrogen to carbon monoxide produced by the coal gasification unit is typically between 0.5:1 and 0.8:1.

The mixture proceeds to the solids removal unit 14 to remove any residual solids and is then mixed with syngas from the SMR unit 20.

In this example, the methane from natural gas is added to the SMR unit 20 along with steam. The SMR unit 20 operates at an outlet temperature of 800° C.-900° C. In the SMR unit 20, methane is converted into a mixture of carbon monoxide and hydrogen primarily by equilibrium reaction (1) shown below.

$$CH_4+H_2O<->CO+3H_2 \qquad (1)$$

Some of the carbon monoxide is further oxidised to carbon dioxide, according to equilibrium reaction (2) below.

$$CO+H_2O<->CO_2+H_2 \qquad (2)$$

The SMR unit 20 comprises a convection section and a radiant section. The convection section preheats the methane and steam whilst the radiant section has tubes with nickel reforming catalyst, and this is where the reactions (1) and (2) take place. The combination of reactions (1) and (2) is endothermic—the heat required is provided by an SMR furnace (not shown) which may be powered by, for example, natural gas, off gas from the Fischer-Tropsch reactor 16 or off gas from a Pressure Swing Adsorption (PSA) unit 18. This can also be designed to run on natural gas exclusively. The design of the SMR unit 20 allows operation with less than two percent oxygen (on dry basis) at the exit of the radiant section.

The net result of these reactions, and other minor reactions, is a product mixture from the SMR unit 20 having an $H_2$/CO ratio of around 5:1 to 6:1. The mixture of hydrogen and carbon monoxide from the SMR unit 20 is typically referred to as SMR synthesis gas or SMR syngas and will hereinafter be referred to as 'SMR syngas'.

The syngas from the coal gasification unit proceeds to the AGR unit 14 where $H_2S$, $CO_2$ and other contaminants may be removed. Optionally a guard bed (not shown) may also be provided in series with, typically downstream of, the AGR 14, also to remove contaminants therefrom.

The syngas from the coal gasification unit and the SMR unit 20 are combined in the appropriate proportions to provide the required hydrogen:carbon monoxide ratio of around 2.

The combined syngas then proceeds to the Fischer-Tropsch reactor 16 where heavy paraffinic synthesis takes place. The products may be further worked, for example hydrogenated, hydrocracked etc in the product work up unit 19.

Thus embodiments of the invention benefit in that the syngas produced from feedstocks having a low hydrogen:carbon ratio may still be used in the optimum hydrogen:carbon monoxide ratio preferred by the Fischer-Tropsch process since they may be combined with syngas produced from a feedstock having a relatively high hydrogen:carbon ratio.

Some of the SMR syngas from the SMR unit 20 may be used as a source of hydrogen. This SMR syngas can proceed to a high temperature shift (HTS) unit 22 where the carbon monoxide is converted to carbon dioxide and thereafter to a PSA unit 18 where the carbon dioxide is removed leaving hydrogen. The hydrogen may be used for various purposes including the hydrocracking and hydrogenation steps performed in the product work up unit 19.

In a preferred embodiment of the invention a combination of coal and coalbed methane is used as feedstock. In particular the carbon dioxide made in the hydrocarbon synthesis plant may be used for enhancing the coalbed methane production. When $CO_2$ is injected into the coal beds, it displaces methane molecules that are attached to the surface of the coal. This methane that is dislodged from the coal is then free to move about in the coal, and it can be produced from the coal. In this way $CO_2$ is sequestered and methane is produced. $CO_2$ is produced in the Fischer-Tropsch reaction, in the steam methane reforming process, including any shift processes, in furnaces, e.g. the SMR-furnace, boiler furnaces, and in gas turbine generators. The carbon dioxide may be recovered by cryogenic techniques, by a membrane separation process, by physical absorption processes (e.g. the Rectisol process using cold methanol) and by chemical absorption process (e.g. aqueous amine solutions). These techniques are all well known in the art. In a further preferred embodiment, any water produced in the coalbed methane production may be used in the steam methane reforming process.

The present process also concerns a process in which the two syngas streams are used in a hydrocarbon synthesis process, especially a Fischer-Tropsch process, the hydrocarbon synthesis process preferably followed by one or more hydrotreatment processes chosen from hydrogenation, hydroisomeriaton, hydrocracking and catalytic dewaxing, optionally followed by distillation in product streams as naphtha, kerosene, gasoil, waxy raffinate, base oil, wax, solvents, detergent feedstocks, drilling fluids and LPG.

Improvements and modifications may be made without departing from the scope of the invention.

What is claimed is:

1. A process for the preparation of syngas from two hydrocarbonaceous sources with different hydrogen:carbon ratios
   the first source comprising coal; and
   the second source comprising coal bed methane;
   in which process the first source is converted into a first syngas stream with a first hydrogen:carbon monoxide ratio, and the second source is converted into a second syngas stream with a second hydrogen:carbon monoxide ratio;
   the first and a part of the second syngas streams are combined into a combined syngas stream, the combined stream having an $H_2$/CO-ratio of between 1.1 and 1.9, while using the other part of the second syngas stream for hydrogen supply, and wherein carbon dioxide as made in a hydrocarbon synthesis process is used for enhancing the production of the coal bed methane by injecting the carbon dioxide into a coal bed where it displaces methane molecules that are attached to the surface of the coal to result in a coal bed methane production.

2. A process as claimed in claim 1, including using at least a portion of the combined syngas stream as a feed to at least one Fischer-Tropsch reactor and using the other part of the second syngas stream for hydrogen supply to the Fischer-Tropsch process or for upgrading the products of that process.

3. A process as claimed in claim 1, wherein the first source is converted to the first syngas stream by partial oxidation.

4. A process as claimed in claim 1, wherein the second source is converted to syngas by autothermal reforming 5. A process as claimed in claim 1, wherein the low hydrogen:carbon monoxide ratio of the first syngas stream is between 0.3 and 1.1, and wherein the high hydrogen:carbon monoxide ratio of the second syngas stream is between 3 and 8.

6. A process as claimed in claim 1, wherein the other part of the second stream of syngas having a high hydrogen:carbon monoxide ratio is used for a second stage Fischer-Tropsch reaction.

7. A process as claimed in claim 1, wherein a part of the second stream of syngas having a high hydrogen:carbon monoxide ratio is treated to remove the carbon monoxide and leave hydrogen.

8. A process as claimed in claim 1, in which the two syngas streams are used in a Fischer-Tropsch process.

9. A process according to claim 1, wherein the coal bed methane is converted to syngas by steam reforming of methane using water as produced in the coal bed methane production.

10. A process according to claim 3, in which the first source is further converted by catalytic reforming 11. A process according to claim 4, further comprising steam reforming of methane or a methane source.

12. A process according to claim 7 in which the hydrogen is used in a process selected from the group consisting of hydrotreating, hydrogenation, hydroisomerisation hydrocracking; catalytic dewaxing, hydrodesulfurisation of condensate, catalyst activation and catalyst regeneration.

* * * * *